United States Patent Office 2,754,916
Patented July 17, 1956

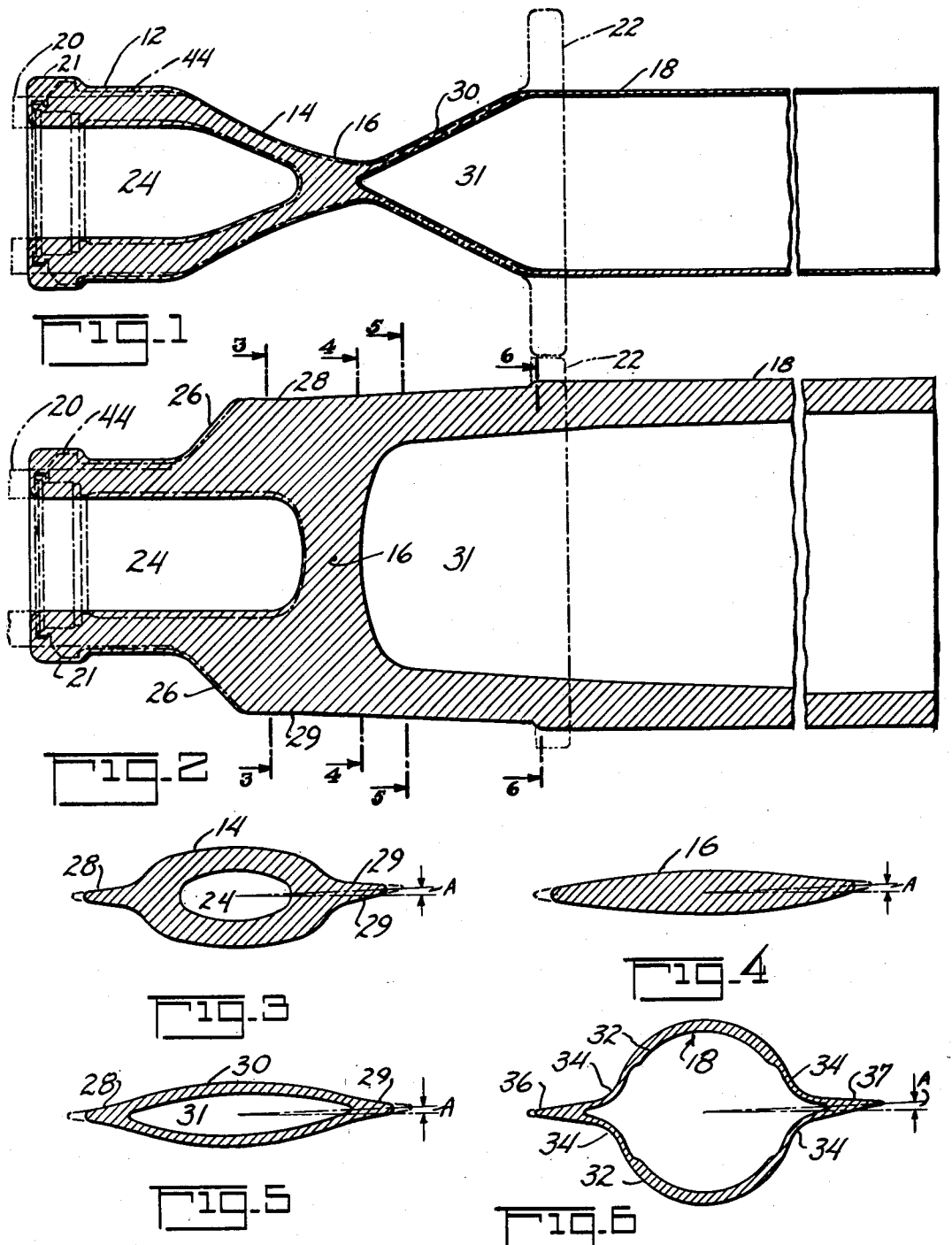

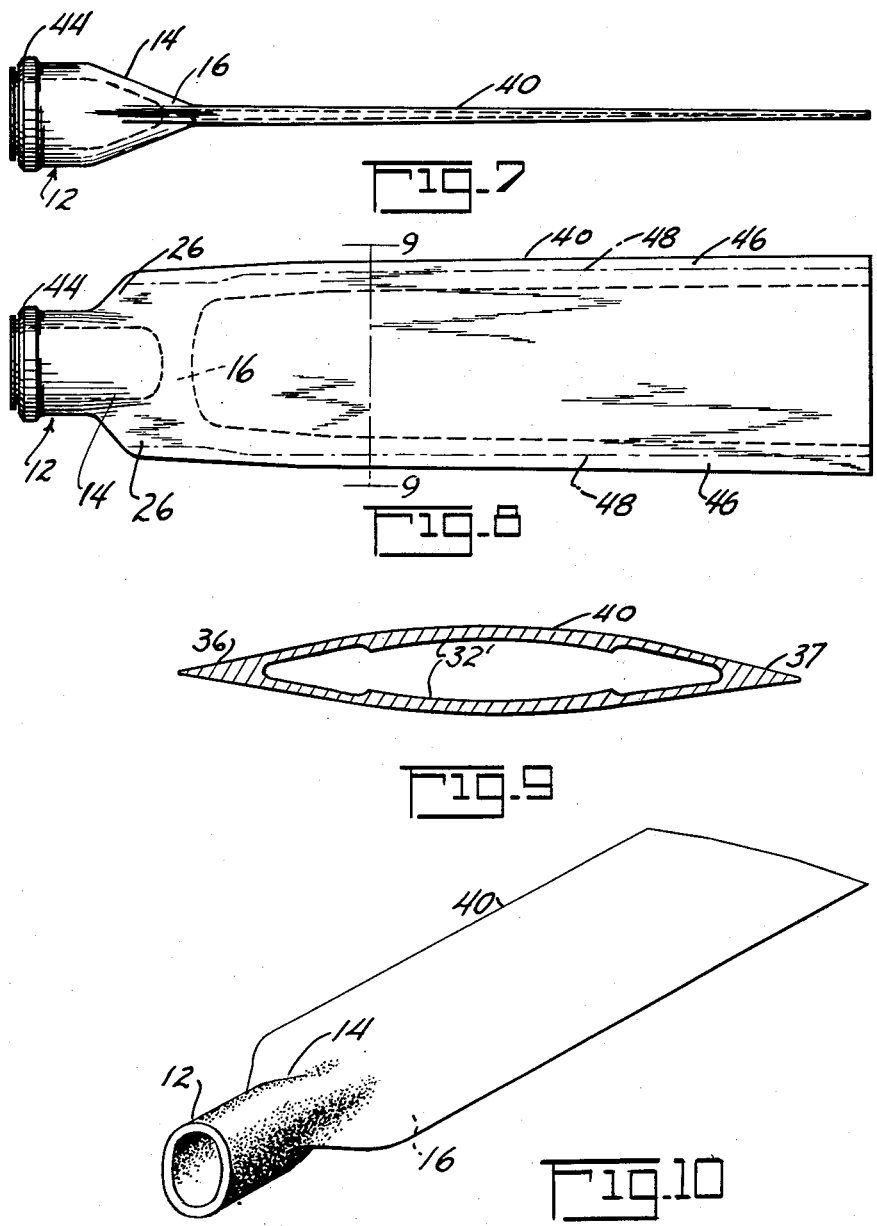

2,754,916

PROPELLER BLADE CONSTRUCTION

Don R. Woolf, Caldwell, N. J., assignor to Curtiss-Wright Corporation, a corporation of Delaware Application May 23, 1952, Serial No. 289,603

2 Claims. (Cl. 170—159)

This invention relates to blades for aircraft propellers and particularly, to improvements in the construction of hollow steel propeller blades.

As the aircraft art has progressed, aircraft and power plants have become larger and concurrently, propellers have increased in size to convert larger engine power to thrust. With the evolution of large propeller blades, hollow steel blades have turned out to be superior to others since they are lighter in weight, have greater structural integrity and more resistence to abrasion than other materials. One modern technique for making these blades is to extrude steel tubes, having a tapered wall thickness, from a solid blank, after which the tubes are flattened and formed to airfoil sectional profile. Such blades comprise a flattened blade portion, a shank portion retained in a propeller hub, and a transition portion which blends the airfoil part of the blade into the shank part. It is always desirable to make the transition portion as short as possible to secure greatest aerodynamic effectiveness of the propeller blade. The transition portion must be designed to blend the blade smoothly into the shank portion so that points of high stress concentration are avoided. For a large completely hollow blade, stresses in and near the short transition region become extremely high and complex, and it is an object of this present invention to provide a blade wherein the stress pattern in and near the transition portion of the blade is simplified, made more determinate, and the stress levels reduced. A further object of the invention is to provide an improved blade configuration which may be produced by extrusion techniques, which will have a short transition portion blending the blade into the shank and which, in the transition portion will have a favorable stress distribution pattern.

A further object of the invention is to provide a blade configuration which is predominately hollow, but which is solid in those parts of the blade where stress concentrations would otherwise occur. Still another object is to provide a blade construction wherein the shank of the blade, including a solid transition zone, is pre-formed, and wherein the airfoil portion may be fabricated as an extrustion and subsequently flattened to blend the solid blade portion into airfoil portion.

Further objects of the invention will become apparent in reading the following detailed description in connection with the drawings and in reading the claims which define the limits of the scope of the invention.

In the drawings, in which similar reference characters denote similar parts,

Fig. 1 is a longitudinal section through an extruded blade blank, taken along a plane normal to the chord of the finished blade, Fig. 2 is a longitudinal section through the blade construction taken on a plane intercepting the chord of the ultimate finished blade, Figs. 3, 4, 5 and 6 are sections respectively on the lines 3—3, 4—4, 5—5, and 6—6 of Fig. 2, Fig. 7 is an edge-wise elevation of a nearly finished blade, Fig. 8 is a plan of a substantially finished blade, Fig. 9 is a section on the line 9—9 of Fig. 8 and Fig. 10 is a perspective elevation of a substantially finished blade.

Referring first to Figs. 1–6, I show in solid lines a blade construction which comprises a shank portion 12, transition portion 14, a solid portion 16, and a blade portion 18. By blade construction is meant a transitory form of a propeller blade during fabrication which, when subjected to additional processing steps, will become a finished propeller blade.

At the beginning, the propeller blade construction comprises a formed forging defined in part by solid lines and in part by dash-dot-dot lines as noted for the shank at 20 and as noted for the blade at 22. The original shank portion of the forging as at 20 is a straight hollow cylinder while the original blade portion of the forging at 22 is a mass of material which subsequently, by known procedures, is extruded to the tapered tube 18. The original shank 20 blends into the transition portion 14 which tapers inwardly from the shank diameter as shown in Fig. 1 to a solid portion 16 of flat elliptical cross-section as noted in Fig. 4. In accordance with Fig. 2, the original shank portion 20, as noted at 24, terminates in the solid portion 16 and broadens as at 26 and as shown in the section of Fig. 3 to comprise a hollow oval section having ears 28 and 29 extending laterally from the shank. The portion 14 of the blade construction blends the hollow cylindrical shank to the solid elliptical portion 16, the latter being relatively thin, of lesser thickness than the diameter of the shank, and being relatively broad, of greater chord than the diameter of the shank.

Rightwardly as shown, from the solid portion 16, the blade construction expands as noted at 30, and also broadens in width, to meet the substantially circular mass 22 which later is extruded to become the tube 18. This rightward end of the initial blade forging is also hollow as at 31, and is of tapered configuration in Fig. 1 while being more or less equally broad through its length as shown in Fig. 2.

The forging above described may be made initially as a pierced forging by conventional procedures after which the surfaces of the hollows may be machined to provide smooth surfaces and accurately established dimensions.

The forging as described is subjected to an extrusion process whereby the mass 22 is converted to the tube 18 which has the general cross-section exemplified in Fig. 6. This extrusion is accomplished by an extrusion press having punch and die elements which are profiled to the form which will, upon extrusion, produce the shape shown in Fig. 6. This shape comprises two central circular parts 32 and 33 of substantial thickness, substantially opposite and thinner fillet parts 34, bordering the parts 32 and 33, and substantially opposite rib parts 36 and 37 which finally, as will be described, form the leading and trailing edges of the finished propeller blade. The insides of the parts 34 and of the ribs 36 and 37 comprise grooves which enter into the ears 28 and 29 and are formed by ribs on the punch of the extrusion press. In the forming, the ribs 36 and 37 comprise continuations of the ears 28 and 29 which are initially provided in the basic forging.

After the blade construction has been brought to the form shown in solid lines in Figs. 1–6, the tubular portion 18 and also the transition portion 30 of the propeller blade rightward of the solid part 16 are flattened in a suitable press and then formed to bring about a blade cross-section of the character shown in Fig. 9, the substantially finished blade having the general appearance when so flattened and formed as exemplified by Figs. 7, 8, and 10.

As an ancillary step of the flattening, the final blade portion 40 is placed between forming dies while hot and is forced outwardly into contact with the die surfaces by high gas pressure applied to the interior of the blade whereby the blade is "blown-up" into the forming dies. In this blow-up operation twist or pitch distribution is also imparted to the propeller blade.

A further process step is to up-set the cylindrical shank end 20 of the propeller blade construction to the form shown in solid lines in Figs. 1 and 2, to thicken the shank and to form a rudimentary flange 21. The thus up-set flange is machined to the form shown in dash-dot lines in the left-hand ends of Figs. 1 and 2, at 44 and as shown also at 44 in Figs. 7 and 8, making provision for assembly of anti-friction retention bearings and mounting of the propeller blade shank in an appropriate hub.

During the foregoing processing steps, the solid portion 16 of the rudimentary blade construction remains in the as-forged condition and likewise, the tapered transition zone 14 remains substantially in the as-forged condition. Flattening occurs only to the right of the solid zone 16.

After the blade has reached its substantially finished configuration as shown in Figs. 7 and 8, additional strips may be welded to the leading and trailing edges thereof as noted at 46 in Fig. 8 which strips provide leading and trailing edge extensions to enable profiling of the airfoil cross-section of the blade to desired form and to yield a blade chord of desired dimension. The dot-dash line 48 in Fig. 8 shows the junction of the edge strips 46 to the blade proper.

Stress patterns in shank-to-blade transition zones, for hollow blades, may be visualized from the following:

Assume a cylindrical tube is secured in a hub and is whirled in the same fashion as a propeller blade; every unit of mass of the tube has a firm structural support along elements of the cylinder which are substantially radial from the hub. Thus every longitudinal element of the cylinder is in substantially pure tension and no transverse bending moments are induced.

Now, assume that the outer parts of the cylinder are pressed flat. The units of mass in the flat portions are urged by centrifugal force to move into radial alinement with the shank of the cylinder, tending to spread the flattened portions apart. This creates high transverse bending moments in the flat parts, chordwise of the blade, which sets up extremely high bending stresses in the material adjacent the edges of the flattened part, reaching, in one example of a structure of this sort, a level of 150,000 to 180,000 lbs. per square inch—an intolerable stress level.

At the same time, the units of mass of material along the edges are urged to aline themselves inwardly, radial with the shank of the cylinder, augmenting the bending moments on the flat plates and acting further to increase maximum stress levels.

If a rigid transverse bulkhead is secured in the tube hollow at the root end of the flat portion, all outer elements of mass of the flat portion are radially alined with the corresponding points on the bulkhead periphery, and stress raising due to the bending moments aforesaid is wholly eliminated. The bulkhead is stressed, of course, but it will be sufficiently strong within itself and contains sufficient material, to hold the maximum stress level to a low value, and the aforesaid bending moments will not appear. The bulkhead here mentioned corresponds to the solid portion 16 in the propeller blade of this disclosure. The shorter the transition from the cylindrical part to the flat part, unless a stress redistributing bulkhead be used, the higher will be the secondary induced stresses in the flat parts of the structure.

In the finished propeller blade of this invention, the solid portion 16 provides an efficient bulkhead to distribute the centrifugally induced tensile stress from the flat airfoil portions of the propeller blade to the shank without inducing secondary stresses in the blade. Looking at Fig. 7, it will be appreciated that tensile stress in the flat part of the blade would tend to spread the flat blade parts apart where the blade blends into the shank portion if the solid portion 16 were not present. The solid portion 16 prevents such spreading and distributes the tensile stress evenly to the transition portion 14 of the propeller blade. In addition, viewing Fig. 8, it will be seen that the solid portions 26 of the blade near the shank provide an effective mass to distribute tensile stresses, acting along the edges of the blade, inwardly to the shank portion 12.

By the construction herein provided, including the solid portion 16, the transition portion 14 of the blade may be made shorter than has been possible heretofore enabling development of the relatively flat, thin, airfoil portion of the propeller blade at a point very close to the blade shank, which is retained in the propeller hub. Also, by these arrangements, the chord of the propeller blade may be made substantially greater than has been possible heretofore while still retaining an effectively low level of stresses in the edges of the propeller blade and the shank portion of the blade.

Referring briefly to Fig. 9, the thickened midchord portions 32' of the blade provide a high moment of inertia to the blade section against bending loads applied in a direction normal to the chord plane of the blade. The moment of inertia of the blade section in the edgewise direction is obviously very high and is augmented by the solid leading and trailing edge portions 36 and 37 of the propeller blade section. In the finished propeller blade, rubber rib arrangements may be formed therein to provide damping for the propeller blade to reduce vibration-induced stresses. Such ribs may be applied as exemplified by Le Compte Patent No. 2,581,193 issued January 1, 1952. The tips of the finished propeller blade may be closed by the insertion of plugs in accordance with Enos Patent No. 2,544,450 issued March 6, 1951. Woolf patent application Serial No. 60,706 filed November 18, 1948, now U. S. Patent No. 2,700,211, provides additional relevant teaching in respect to extrusion techniques and as to the formation of leading and trailing edge ribs on the extrusion prior to flattening of the blade construction to propeller blade form.

In Figs. 3–6, an angle A is indicated which represents an angular off-set between the leading and trailing edge ribs 28 and 30, and of the leading and trailing edge ribs 36 and 37 of the propeller blade. This off-set is to compensate, in the final forming of the propeller blade, the difference in curvature between the thrust and camber surfaces of the blade. Normally, the camber surface has greater curvature than the thrust surface to endow the blade with the desired airfoil section.

Though one embodiment of the invention is shown, it is to be understood that the invention may be applied in various forms and in various environments. Changes may be made in the arrangements shown without departing from the spirit of the invention. Reference should be had to the appended claims for definition of the limits of the invention.

What is claimed is:

1. A propeller blade comprising a hollow cylindrical shank, a hollow transition portion of sharply tapered form integral with said shank, a solid bulkhead portion integral with said transition portion having elliptical form, the major axis of the ellipse being greater than the shank diameter and the minor axis of the ellipse being substantially less than the shank diameter, said transition portion blending the cross section of the shank portion smoothly to the form of said solid portion, and a substantially flat thin hollow blade portion integral with and extending outwardly from said solid portion, said blade portion at its inner end being substantially elliptical in form with the major and minor axes of the ellipse substantially the same as the major and minor axes of said solid portion, said blade portion having substantially the same chord dimensions throughout its length and tapering to a lesser thickness from said solid portion to the blade tip.

2. A propeller blade comprising a hollow cylindrical shank, a substantially flat, hollow blade portion of substantially rectangular plan form, a transition portion between and joining said shank and blade portions, integral therewith, said transition portion having a chord, close to said shank, substantially the same as that of the blade portion and larger in dimension than the diameter of said shank portion, said transition portion tapering sharply in thickness from the diameter of said shank portion to the lesser thickness dimension of said blade portion and blending said shank portion to said blade portion, said transition portion being hollow at its shank end, the hollow thereof being a continuation of the hollow of said cylindrical shank, and said transition portion being solid at its blade portioned end in the zone adjacent its integral junction with said blade portion, and of substantially the same thickness as said blade portion.

References Cited in the file of this patent

UNITED STATES PATENTS

| Number | Name | Date |
|---|---|---|
| 1,682,399 | Mitchell | Aug. 28, 1928 |
| 1,772,876 | Parsons | Aug. 12, 1930 |
| 1,774,563 | Parsons | Sept. 2, 1930 |
| 1,937,966 | Junkers | Dec. 5, 1933 |
| 1,992,338 | Whitworth | Feb. 26, 1935 |
| 2,262,163 | Brauchler | Nov. 11, 1941 |
| 2,266,858 | Gehret | Dec. 23, 1941 |
| 2,303,707 | Pullin | Dec. 1, 1942 |
| 2,394,446 | Handler | Feb. 5, 1946 |
| 2,431,411 | McKee | Nov. 25, 1947 |
| 2,535,917 | Gruetjen | Dec. 26, 1950 |
| 2,581,193 | Le Compte | Jan. 1, 1952 |
| 2,620,885 | Lampton | Dec. 9, 1952 |
| 2,659,444 | Stanley | Nov. 17, 1953 |